C. W. DIETRICH.
SUSPENSION CLAMP.
APPLICATION FILED DEC. 22, 1916.

1,281,531.

Patented Oct. 15, 1918.

Witnesses:

Inventor:
Charles W. Dietrich.
By Dyrenforth, Lee, Chritton and Wiles
Att'ys

UNITED STATES PATENT OFFICE.

CHARLES W. DIETRICH, OF CHICAGO, ILLINOIS.

SUSPENSION-CLAMP.

1,281,531.  Specification of Letters Patent.  Patented Oct. 15, 1918.

Application filed December 22, 1916. Serial No. 138,383.

*To all whom it may concern:*

Be it known that I, CHARLES W. DIETRICH, a citizen of the United States, residing at Chicago, in the county of Cook and State of Illinois, have invented a new and useful Improvement in Suspension-Clamps, of which the following is a specification.

My invention relates to an improvement in clamps for suspending from overhead girders, or the like, shafting, machinery, and other appliances and objects, the particular type of clamp to which my invention relates involving means for overlappingly engaging flanges on the overhead girders.

My object is to provide a clamp of such construction that it may be applied in operative position to girders of different widths and with base flanges of different thicknesses, and which shall be of simple and economical construction and readily applied for use.

Figure 1:
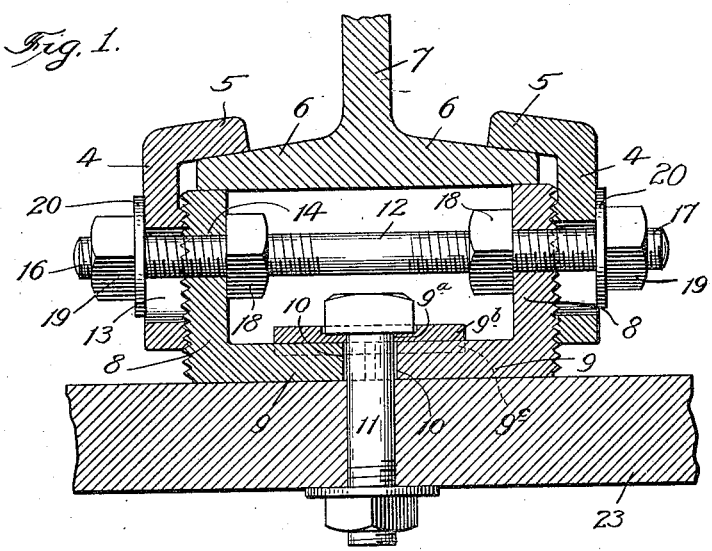
Figure 2:
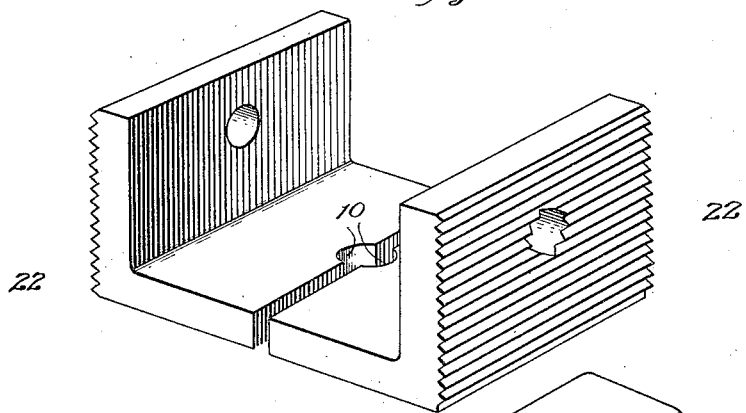
Figure 3:
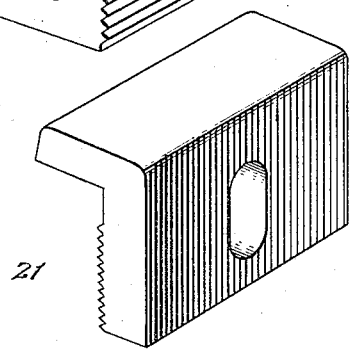

Referring to the accompanying drawing; Figure 1 is a view in sectional elevation of a clamp constructed in accordance with my invention, this view showing the clamp as applied to an I-beam girder also shown in section and partly broken away, with a platform, shown partly broken away, supported from the clamp. Fig. 2 is a perspective view of the two innermost members of the clamp showing them in the relative positions they occupy when assembled with the other parts of the clamp; and Fig. 3, a similar view of one of the outer members of the clamp and which are provided with the means whereby the clamp overlappingly engages, the flanges of the girder.

My improved suspension clamp is provided more particularly for coöperation with the girders in the ceilings of buildings, whether the girders be exposed, or concealed, in the finished structure, though it will be readily understood that the invention is not limited to such a structure.

My improved clamp, as I prefer to construct it, involves a pair of members 4 each provided at its upper edge with an inwardly-projecting flange 5 adapted to overlappingly engage a flange 6 of a girder such as the one represented at 7; and a pair of inner members 8 adapted to bear at their outer surfaces against the inner surfaces of the members 4 and provided with inwardly-projecting flanges 9 each recessed as indicated at 10 to receive a bolt 11, where it is desired that the object to be supported from the clamp, be hung from these members. The bolt passes through an opening $9^a$ in a plate $9^b$ which overlies the adjacent ends of the flanges 9 and has depending flanges $9^c$, one of which is indicated by dotted lines, which overlap the vertical edges of the flanges 9, as shown in my U. S. Patent No. 1,203,187, granted Oct. 31, 1916.

According to the construction illustrated, the members 4 and 8 are clamped together through the medium of a bolt 12 which passes through apertures 13 and 14 in the members 4 and 8, respectively, the bolt 12 having its opposite ends, at which it extends through the said openings, threaded as indicated at 16 and 17, with nuts 18 screwed thereon to extend adjacent the inner faces of the members 8, and having nuts 19 screwed on the extreme outer ends of the bolt to bear against the outer surfaces of the members 4, it being preferred that washers 20 be interposed between the nuts 19 and the members 4.

According to my invention the members 4 and 8 are lineally adjustable to vary the space between the upper edges of the members 8 and the inner, or lower, surfaces of the flanges 5 to adapt the clamp to be adjusted for rigid connection with girders having flanges of different thicknesses, the clamp when applied to use being so positioned relative to the girder that the flanges 6 extend between the upper surfaces of the members 8 and the inner surfaces of the members 5, an additional adjustment for different widths of flanges being afforded by means of the adjustable nuts 18. Where the clamping-bolt 12 extends through the members 4 and 8, as stated, it is necessary that one or the other of the openings 13 or 14 be vertically elongated to permit of the lineal adjustment referred to, the openings 13 in the construction illustrated being the ones which are provided of elongated form, for the purpose stated.

The mutual abutting faces of the members 4 and 8 are preferably roughened, to insure the positive clamping of these members in adjusted position, this roughening preferably taking the form shown which involves the serrating or grooving of these mutually abutting surfaces as indicated at 21 and 22, respectively, it being understood that the serrations or grooves 21 extend along the inner faces of the members 4, as shown of the members 8, this form of roughening producing a positive interlocking between these relatively adjustable members.

The manner of using my improved suspension clamp is as follows:

Assuming that the clamp is to be applied to a girder as, for example, the girder 7, the nuts 18 which form abutments, are first screwed upon the bolt 12, the members 8 and 4 then slipped in succession upon the bolt to the positions shown in Fig. 1 wherein the flanges 6 of the girder extend between the upper surfaces of the members 8 and the inner surfaces of the flanges 5, the latter thus overlappingly engaging the said flanges. The nuts 19 are then applied to the bolt 12 and tightened to clamp the members 4 and 8 rigidly together with their opposed serrated portions 21 and 22 interfitting. In applying the clamp, as stated, the members 4 and 8 are relatively adjusted lineally to effect a tight fit of the jaws of the clamp formed of the flanges 5 and the members 8, against the flanges 6, and where the serrations 21 and 22 are relatively coarse, the adjustment of the members 4 and 8 along the bolt 12, involving the adjustment of the nuts 18, may be necessary to cause the serrations to interlock with each other, to the desired depth. The plate 9^b is then applied to position and the bolt 11 inserted into place as shown.

In the particular construction illustrated the clamp is adapted for suspending a platform such as that represented at 23, to which shafting, or the like, may be secured, this platform being connected with the clamp through the medium of the bolt 11.

It will be understood from the foregoing description that a clamp constructed in accordance with my invention is not only simple of construction and may be manufactured relatively economically, but that it provides for its ready adjustment to girders of different widths and having flanges of different thicknesses.

While I have illustrated and described a particular construction in which my invention is embodied, I do not wish to be understood as intending to limit it thereto, as the same may be variously modified and altered without departing from the spirit of my invention, it being my intention to claim my invention as fully and completely as the prior state of the art will permit.

What I regard as new and desire to secure by Letters Patent is—

1. A suspension clamp comprising a pair of members having projections at their upper ends for engagement with the support from which the clamp is to be suspended, members extending below said projections, to afford with said projections, spaces adapted to receive the edges of said support, said first and second-named members being relatively adjustable lineally to vary the spaces between said projections and said first-named members, and said second-named members being provided with means for supporting an object therefrom, and means for holding said members in relatively adjusted position.

2. A suspension clamp comprising a pair of members having projections at their upper ends for engagement with the support from which the clamp is to be suspended, members extending below said projections, to afford with said projections, spaces adapted to receive the edges of said support, said first and second-named members being relatively adjustable lineally to vary the spaces between said projections and said second-named members, said second-named members being provided with flanges adapted to have attached thereto, the article to be suspended from the clamp, and means for holding said members in relatively adjusted position.

CHARLES W. DIETRICH.

Copies of this patent may be obtained for five cents each, by addressing the "Commissioner of Patents, Washington, D. C."